(12) United States Patent
Wang et al.

(10) Patent No.: US 7,538,159 B2
(45) Date of Patent: May 26, 2009

(54) NANOPARTICLES WITH CONTROLLED ARCHITECTURE AND METHOD THEREOF

(75) Inventors: Xiaorong Wang, Hudson, OH (US); Victor J. Foltz, Akron, OH (US); Pat Sadhukhan, Akron, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 397 days.

(21) Appl. No.: 11/305,281

(22) Filed: Dec. 16, 2005

(65) Prior Publication Data
US 2007/0142559 A1   Jun. 21, 2007

(51) Int. Cl.
C08F 279/00   (2006.01)
(52) U.S. Cl. .................................... 525/313; 525/332.2
(58) Field of Classification Search ................. 525/313, 525/332.2
See application file for complete search history.

(56) References Cited

U.S. PATENT DOCUMENTS

| | | | |
|---|---|---|---|
| 2,531,396 A | 11/1950 | Carter et al. |
| 3,598,884 A | 8/1971 | Wei |
| 3,793,402 A | 2/1974 | Owens |
| 3,840,620 A | 10/1974 | Gallagher |
| 3,972,963 A | 8/1976 | Schwab et al. |
| 4,233,409 A | 11/1980 | Bulkley |
| 4,247,434 A | 1/1981 | Vanderhoff et al. |
| 4,326,008 A | 4/1982 | Rembaum |
| 4,386,125 A | 5/1983 | Shiraki et al. |
| 4,463,129 A | 7/1984 | Shinada et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fluwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawakubo et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |

(Continued)

FOREIGN PATENT DOCUMENTS

CA   2127919   3/1995

(Continued)

OTHER PUBLICATIONS

Akashi, Mitsuru et al., "Synthesis and Polymerization of a Styryl Terminated Oligovinylpyrrolidone Macromonomer, Die Angewandte Makromolekulare Chemie", 132, pp. 81-89 (1985).

(Continued)

*Primary Examiner*—Bernard Lipman
(74) *Attorney, Agent, or Firm*—Nathan T. Lewis; Meredith E. Hooker

(57) ABSTRACT

The present invention provides polymer nanoparticles with a controlled architecture of nano-necklace, nano-cylinder, nano-ellipsoid, or nano-sphere. The polymer nanoparticle comprises a core polymerized from multiple-vinyl-substituted aromatic hydrocarbons, a shell polymerized from alkyl-substituted styrene, and a polystyrene layer between the core and the shell. The present invention also provides a method of preparing the polymer nanoparticles and a rubber article such as a tire manufactured from a formulation comprising the polymer nanoparticles.

11 Claims, 5 Drawing Sheets

U.S. PATENT DOCUMENTS

| | | |
|---|---|---|
| 5,614,579 A | 3/1997 | Roggeman et al. |
| 5,627,252 A | 5/1997 | De La Croi Habimana |
| 5,688,856 A | 11/1997 | Austgen, Jr. et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,354 B1 | 3/2001 | Wang et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heinrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0228074 A1 | 10/2005 | Wang et al. |
| 2005/0282956 A1 | 12/2005 | Bohm et al. |
| 2006/0084722 A1 | 4/2006 | Lin et al. |
| 2006/0173115 A1 | 8/2006 | Wang et al. |
| 2006/0173130 A1 | 8/2006 | Wang et al. |
| 2006/0235128 A1 | 10/2006 | Bohm et al. |
| 2007/0135579 A1 | 6/2007 | Obrecht et al. |
| 2007/0142550 A1 | 6/2007 | Wang et al. |
| 2007/0149649 A1 | 6/2007 | Wang et al. |
| 2007/0161754 A1 | 7/2007 | Bohm et al. |
| 2007/0185273 A1 | 8/2007 | Hall et al. |
| 2007/0196653 A1 | 8/2007 | Hall et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |

FOREIGN PATENT DOCUMENTS

| | | |
|---|---|---|
| DE | 3434983 | 4/1986 |
| DE | 4241538 | 6/1994 |
| EP | 0143500 | 6/1985 |
| EP | 0255170 | 2/1988 |
| EP | 0265142 | 4/1988 |
| EP | 0265145 | 4/1988 |
| EP | 0322905 | 7/1989 |
| EP | 0352042 | 1/1990 |

| | | |
|---|---|---|
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 1/2003 |
| EP | 1321489 | 6/2003 |
| EP | 1783168 | 5/2007 |
| FR | 2099645 | 3/1972 |
| JP | 01279943 | 1/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08199062 | 8/1996 |
| JP | 2000-514791 | 11/2000 |
| JP | 2003-095640 | 4/2003 |
| JP | 2006-072283 | 3/2006 |
| JP | 2006-106596 | 4/2006 |
| JP | 2007-304409 | 11/2007 |
| WO | 91/04992 | 4/1991 |
| WO | 97/04029 | 2/1997 |
| WO | 9853000 | 11/1998 |
| WO | 0075226 | 12/2000 |
| WO | 01/87999 | 11/2001 |
| WO | 02/031002 | 4/2002 |
| WO | 02/081233 | 10/2002 |
| WO | 02/100936 | 12/2002 |
| WO | 03/032061 | 4/2003 |
| WO | 03085040 | 10/2003 |
| WO | 2004/058874 | 7/2004 |
| WO | 2006/069793 | 7/2006 |
| WO | 2008/079276 | 7/2008 |
| WO | 2008/079807 | 7/2008 |
| WO | 2009/006434 | 1/2009 |

OTHER PUBLICATIONS

Alexandridis, Paschalis et al., "Amphiphilic Block Copolymers: Self-Assembly and Applications", Elsevier Science B.V., pp. 1-435 (2000).
Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).
Antonietti, Markus et al., "Determination of the Micelle Architecture of Polystyrene/Poly(4-vinylpyridine) Block Copolymers in Dilute Solution", Macromolecules, 27, pp. 3276-3281 (1994).
Antonietti, Markus et al., "Novel Amphiphilic Block Copolymers by Polymer Reactions and Their Use of Solubilization of Metal Salts and Metal Colloids", Macromolecules, 29, pp. 3800-3806 (1996).
Batzilla, Thomas et al., "Formation of intra- and intermolecular crosslinks in the radical crosslinking of poly(4-vinylstyrene)", Makromol. Chem., Rapid Commun. 8, pp. 261-268 (1987).
Bauer, B.J. et al., "Synthesis and Dilute-Solution Behavior of Model Star-Branched Polymers", Rubber Chemistry and Technology, vol. 51, pp. 406-436 (1978).
Berger, G. et al., "Mutual Termination of Anionic and Cationic 'Living' Polymers", Polymer Letters, vol. 4, pp. 183-186 (1966).
Bradley, John S., "The Chemistry of Transition Metal Colloids", Clusters and Colloids: From Theory to Applications, Chapter 6, Weinheim, VCH, pp. 459-544 (1994).
Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).
Calderara, Frederic et al., "Synthesis of chromophore-labelled polystyrene/poly(ethylene oxide) diblock copolymers", Makromol. Chem., 194, pp. 1411-1420 (1993).
Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).
Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).
Erhardt, Rainer et al., Macromolecules, vol. 34, No. 4, pp. 1069-1075 (2001).
Eschwey, Helmut et al., "Preparation and Some Properties of Star-Shaped Polymers with more than Hundred Side Chains", Die Makromolekulare Chemie 173, pp. 235-239 (1973).
Eschwey, Helmut et al., "Star polymers from styrene and divinylbenzene", Polymer, vol. 16, pp. 180-184 (Mar. 1975).
Fendler, Janos H., "Nanoparticles and Nanostructured Films: Preparation, Characterization and Applications", Wiley-VCH, pp. 1-468 (1998).
Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).
Hamley, Ian W., "The Physics of Block Copolymers", Oxford Science Publication: Oxford, Chapters 3 and 4, pp. 131-265, (1998).
Ishizu, Koji et al., "Synthesis of Star Polymer with Nucleus of Microgel", Polymer Journal, vol. 12, No. 6, pp. 399-404 (1980).
Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).
Liu, Guojun et al., "Diblock Copolymer Nanofibers", Macromolecules, 29, pp. 5508-5510 (1996).
Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).
Ma, Qinggao et al., "Entirely Hydrophilic Shell Cross-Linked Knedel-Like (SCK) Nanoparticles", Polymer Preprints, vol. 41, No. 2, pp. 1571-1572 (2000).
Mayer, A.B.R. et al., "Transition metal nanoparticles protected by amphiphilic block copolymers as tailored catalyst systems", Colloid Polym. Sci., 275, pp. 333-340 (1997).
Mi, Yongli et al., "Glass transition of nano-sized single chain globules", Polymer 43, Elsevier Science Ltd., pp. 6701-6705 (2002).
Nace, Vaughn M., "Nonionic Surfactants: Polyoxyalkylene Block Copolymers", Surfactant Science Series, vol. 60, pp. 1-266 (1996).
Okay, Oguz et al., "Steric stabilization of reactive microgels from 1,4-divinylbenzene", Makromol. Chem., Rapid Commun., vol. 11, pp. 583-587 (1990).
Okay, Oguz et al., "Anionic Dispersion Polymerization of 1,4-Divinylbenzene", Macromolecules, 23, pp. 2623-2628 (1990).
Piirma, Irja, "Polymeric Surfactants", Surfactant Science Series, vol. 42, pp. 1-289 (1992).
Price, Colin, "Colloidal Properties of Block Copolymers", Applied Science Publishers Ltd., Chapter 2, pp. 39-80 (1982).
Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).
Rein, David H. et al., "Kinetics of arm-first star polymers formation in a non-polar solvent", Macromol. Chem. Phys., vol. 199, pp. 569-574 (1998).
Rempp, Paul et al., "Grafting and Branching of Polymers", Pure Appl. Chem., vol. 30, pp. 229-238 (1972).
Riess, Gerard et al., "Block Copolymers", Encyclopedia of Polymer Science and Engineering, vol. 2, pp. 324-434 (1985).
Saito, Reiko et al., "Synthesis of Microspheres with Microphase-Separated Shells", Journal of Polymer Science: Part A: Polymer Chemistry, vol. 38, pp. 2091-2097 (2000).
Serizawa, Takeshi et al., "Transmission Electron Microscopic Study of Cross-Sectional Morphologies of Core-Corona Polymeric Nanospheres", Macromolecules, 33, pp. 1759-1764 (2000).
Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Tsitsilianis, Constantinos et al., Makromol. Chem. 191, pp. 2319-2328 (1990).

Tuzar, Zdenek et al., "Micelles of Block and Graft Copolymers in Solutions", Surface and Colloid Science, vol. 15, Chapter 1, pp. 1-83 (1993).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Synthesis, Characterization, and Application of Novel Polymeric Nanoparticles", Macromolecules, 40, pp. 499-508 (2007).

Webber, Stephen E. et al., "Solvents and Self-Organization of Polymers", NATO ASI Series, Series E: Applied Sciences, vol. 327, pp. 1-509 (1996).

Wooley, Karen L, "From Dendrimers to Knedel-like Structures", Chem. Eur. J., 3, No. 9, pp. 1397-1399 (1997).

Wooley, Karen L; "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

Formation of Worm-like Micelles from a Polystyrene-Polybutadiene-Polystyrene Block Copolymer in Ethyl Acetate, Canham et al., J.C.S. Faraday I, 1980, 76, 1857-1867.

Anomalous Behaviour of Solutions of Styrene-Butadiene Block Copolymers in Some Solvents, Tuzar et al., Makromol. Chem. 178, 22743-2746, 1977.

Association of Block Copolymers in Selective Solvents 1 Measurements on Hydrogenated Poly(styrene-isoprene) in Decane and in trans-Decalin, Mandema et al., Makromol. Chem. 180, 1521-1538, 1979.

Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.

Greenwod, N.N.; Earnshaw, A., Chemistry of the Elements, pp. 1126-1127, Pergaroen Press, New York 1984.

Functionalized Core-Shell Polymers Prepared by Microemulsion Polymerization, E. Mendizabal et al., Dept. of Ingenieria Quimica, Unviv. De Guadalajara, MX, 477/ANTE 97/1733-1737.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.

Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Wiliey & Sons, Inc.

R.P. Quirk and S.C. Galvan, Macromolecules, 34, 1192-1197 (2001).

M. Moller, J.P. Spaz, A. Roescher, S. Mobmer, S.T. Selvan, H.A. Klok, Macromol. Symp. 117, 207-218 (1997).

T. Cosgrove, J.S. Phipps, R.M. Richardson, Macromolecules, 26, 4363-4367 (1993).

S. Mossmer, J.P. Spatz, M.Moller, T. Aberle, J. Schmidt, W. Burchard, Macromol. 33, 4791-4798 (2000).

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.

Super-Repellent Composite Fluoropolymer Surfaces, S.R. Coulson, I. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.

Transformation of a Simple Plastic into a Superhydrophobic Surface, H. Yildirim Erbil et al., Science vol. 299, Feb. 28, 2003, pp. 1377-1380.

Reaction of Primary Aliphatic Amines with Maleic Anhydride, Lester E. Coleman et al., J. Org,. Chem., 24, 185, 1959, pp. 135-136.

Synthesis, Thermal Properties and Gas Permeability of Poly (N-n-alkylmaleimide)s, A. Matsumoto et al., Polymer Journal vol. 23, No. 3, 1991, pp. 201-209.

Simultaneous TA and MS Analysis of Alternating Styrene-Malei Anhydride and Styrene-Maleimide Copolymers, Thermochim. Acta, 277, 14, 1996.

Synthesis and Photocrosslinking of Maleimide-Type Polymers, Woo-Sik Kim et al., Macromol. Rapid Commun., 17, 835, 1996, pp. 835-841.

Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.

Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.

Vulcanization Agents and Auxiliary Materials, Kirk-Othmer, Encyclopedia of Chemical Technology, 3rd Ed., Wiley Interscience, NY, 1982, vol. 22, pp. 390-403.

Dialkylimidazolium Chloroaluminate Melts: A New Class of Room-Temperature Ionic Liquids for Electrochemistry, Spectroscopy, and Synthesis, J.S. Wilkes, J.A. Levisky, B.A. Wilson, Inorg. Chem. 1982, 21, pp. 1263-1264.

Polymer-m-Ionic-Liquid Electrolytes C. Tiyapiboonchaiya, D.R. MacFarlane, J. Sun, M. Forsyth, Micromol. Chem. Phys., 2002, 203, pp. 1906-1911.

EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.

Structure of molten 1,3-dimethylimidazolium chloride using neutron diffraction.C. Hardacre, J.D. Holbrey, S.E. J. McMath, D.T. Bowron, A.K. Soper, J. Chem. Physics, 2003, 118(1), pp. 273-278.

Reverse Atom Transfer Radical Polymerization of Methyl Methacrylate in Room-Temperature Inoic Liqquids, H. Ma, X. Wan, X. Chen, Q-F. Zhou, J. Polym. Sci., A. Polym. Chem. 2003, 41, pp. 143-151.

Non-Debye Relaxations in Disordered Ionic Solids, W. Dieterich, P. Maass, Chem. Chys. 2002, 284, pp. 439-467.

Polymer Layered Silicate Nanocomposites, Giannelis E.P. Advanced Materials vol. 8, No. 1, Jan. 1, 1996, pp. 29-35.

A Review of Nanocomposites 2000, J.N. Hay, S. J. Shaw.

Recent Advances in Flame Retardant Polymer Nanocomposites, Tilman, J.W. et al., pp. 273-283.

"Dendrimers and Dendrons, Concept, Synthesis, Application", edited by Newkome G.R, Wiley-VCH, 2001, pp. 45, 191-310.

"Synthesis, Functionalization and Surface Treatment of Nanoparticles", edited by Baraton M-I, ASP (Am. Sci. Pub.), Stevenson Ranch, California, 2003, pp. 51-52, 174-208.

Borukhov, Itamar et al., "Enthalpic Stabilization of Brush-Coated Particles in a Polymer Melt", Macromolecules, vol. 35, pp. 5171-5182 (2002).

Braun, Hartmut et al., "Enthalpic interaction of diblock copolymers with immiscible polymer blend components", Polymer Bulletin, vol. 32, pp. 241-248 (1994).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Ferreira, Paula G. et al., "Scaling Law for Entropic Effects at Interfaces between Grafted Layers and Polymer Melts", Macromolecules, vol. 31, pp. 3994-4003 (1998).

Gay, C., "Wetting of a Polymer Brush by a Chemically Identical Polymer Melt", Macromolecules, vol. 30, pp. 5939-5943 (1997).

Halperin, A., "Polymeric Micelles: A Star Model", Macromolecules, vol. 20, pp. 2943-2946 (1987).

Hasegawa, Ryuichi et al., "Optimum Graft Density for Dispersing Particles in Polymer Melts", Macromolecules, vol. 29, pp. 6656-6662 (1996).

Kraus, Gerard, "Mechanical Losses in Carbon-Black-Filled Rubbers", Journal of Applied Polymer Science: Applied Polymer Symposium, vol. 39, pp. 75-92 (1984).

Ligoure, Christian, "Adhesion between a Polymer Brush and an Elastomer: A Self-Consistent Mean Field Model", Macromolecules, vol. 29, pp. 5459-5468 (1996).

Matsen, M.W., "Phase Behavior of Block Copolymer/Homopolymer Blends", Macromolecules, vol. 28, pp. 5765-5773 (1995).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Noolandi, Jaan et al., "Theory of Block Copolymer Micelles in Solution", Macromolecules, vol. 16, pp. 1443-1448 (1983).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Shull, Kenneth R., "End-Adsorbed Polymer Brushes in High- and Low-Molecular-Weight Matrices", Macromolecules, vol. 29, pp. 2659-2666 (1996).

Wang, Xiaorong et al., "Strain-induced nonlinearity of filled rubbers", Physical Review, E72, 031406, 9 pp. (Sep. 20, 2005).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Witten, T.A. et al., "Stress Relaxation in the Lamellar Copolymer Mesophase", Macromolecules, vol. 23, pp. 824-829 (1990).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Bahadur, Pratap, "Block copolymers- Their microdomain formation (in solid state) and surfactant behaviour (in solution)", Current Science, vol. 80, No. 8, pp. 1002-1007, Apr. 25, 2001.

Guo, Andrew et al., "Star Polymers and Nanospheres from Cross-Linkable Diblock Copolymers", Macromolecules, vol. 29, pp. 2487-2493, Jan. 17, 1996.

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

O'Reilly, Rachel K. et al., "Cross-linked block copolymer micelles: functional nanostructures of great potential and versatility", Chem. Soc. Rev., vol. 35, pp. 1068-1083, Oct. 2, 2006.

Oranli, Levent et al., "Hydrodynamic studies on micellar solutions of styrene-butadiene block copolymers in selective solvents", Can. J. Chem., vol. 63, pp. 2691-2696, 1985.

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Riess, Gerard, "Micellization of block copolymers", Prog. Polym. Sci., vol. 28, pp. 1107-1170, Jan. 16, 2003.

Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.

Thurmond, K. Bruce et al., "Shell cross-linked polymer micelles: stabilized assemblies with great versatility and potential", Colloids and Surfaces B: Biointerfaces, vol. 16, pp. 45-54, 1999.

Wilson, D.J. et al., "Photochemical Stabilization of Block Copolymer Micelles", Eur. Polym. J., vol. 24, No. 7, pp. 617-621, 1988.

Ege, Seyhan, Organic Chemistry Structure and Reactivity, 3rd Edition, p. 959, 1994.

Oct. 20, 2005 Office Action from U.S. Appl. No. 11/104,759, filed Apr. 13, 2005 (12 pp.).

Aug. 21, 2006 Final Office Action from U.S. Appl. No. 11/104,759, filed Apr. 13, 2005 (14 pp.).

Dec. 22, 2006 Advisory Action from U.S. Appl. No. 11/104,759, filed Apr. 13, 2005 (3 pp.).

May 16, 2007 Office Action from U.S. Appl. No. 11/104,759, filed Apr. 13, 2005 (9 pp.).

Oct. 30, 2007 Final Office Action from U.S. Appl. No. 11/104,759, filed Apr. 13, 2005 (11 pp.).

Harlan, Robert D., Final Office Action dated Dec. 10, 2008 from U.S. Appl. No. 10/791,177 (8 pp.).

Cain, Edward J., Final Office Action dated Dec. 9, 2008 from U.S. Appl. No. 11/642,795 (6 pp.).

Mulcahy, Peter D., Restriction/Election Office Action dated Dec. 11, 2008 from U.S. Appl. No. 11/642,802 (7 pp.).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Kralik, M. et al., "Catalysis by metal nanoparticles supported on functional organic polymers", Journal of Molecular Catalysis A: Chemical, vol. 177, pp. 113-138 [2001].

O'Reilly, Rachel K. et al., "Functionalization of Micelles and Shell Cross-linked Nanoparticles Using Click Chemistry", Chem. Mater., vol. 17, No. 24, pp. 5976-5988 [Nov. 24, 2005].

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

Saito, Reiko et al., "Arm-number effect of core-shell type polymer microsphere: 1. Control of arm-number of microsphere", Polymer, vol. 35, No. 4, pp. 866-871 (1994).

Wang, Xiaorong et al., U.S. Appl. No. 10/791,049, filed Mar. 2, 2004 entitled "Method Of Making Nano-Particles Of Selected Size Distribution".

Wang, Xiaorong et al., U.S. Appl. No. 10/791,177, filed Mar. 2, 2004 entitled "Rubber Composition Containing Functionalized Polymer Nanoparticles".

Wang, Xiaorong et al., U.S. Appl. No. 10/872,731, filed Jun. 21, 2004 entitled "Reversible Polymer/Metal Nano-Composites And Method For Manufacturing Same".

Wang, Xiaorong et al., U.S. Appl. No. 10/886,283, filed Jul. 6, 2004 entitled "Hydropobic Surfaces with Nanoparticles".

Wang, Xiaorong et al., U.S. Appl. No. 11/058,156, filed Feb. 15, 2005 entitled "Multi-Layer Nano-Particle Preparation And Applications".

Wang, Xiaorong et al., U.S. Appl. No. 11/104,759, filed Apr. 13, 2005 entitled "Nano-Particle Preparation And Applications".

Bohm, Georg G.A. et al., U.S. Appl. No. 11/117,981, filed Apr. 29, 2005 entitled "Self Assembly Of Molecules To Form Nano-Particle".

Wang, Xiaorong et al., U.S. Appl. No. 11/305,279, filed Dec. 16, 2005 entitled "Combined Use Of Liquid Polymer And Polymeric Nanoparticles For Rubber Applications".

Wang, Xiaorong et al., U.S. Appl. No. 11/344,861, filed Feb. 1, 2006 entitled "Nano-Composite And Compositions Therefrom".

Wang, Xiaorong et al., U.S. Appl. No. 11/642,796, filed Dec. 20, 2006 entitled "Hollow Nano-Particles And Method Thereof".

Wang, Xiaorong et al., U.S. Appl. No. 11/764,607, filed Jun. 18, 2007 entitled "Multi-Layer Nano-Particle Preparation and Applications".

Warren, Sandra, U.S. Appl. No. 11/771,659, filed Jun. 29, 2007 entitled "One-Pot Synthesis Of Nanoparticles And Liquid Polymer For Rubber Applications".

Wang, Xiaorong et al., U.S. Appl. No. 11/941,128, filed Nov. 16, 2007 entitled "Nano-Particle Preparation And Applications".

Wang, Xiaorong et al., U.S. Appl. No. 11/954,268, filed Dec. 12, 2007 entitled "Nanoporous Polymeric Material And Preparation Method".

Wang, Xiaorong et al., U.S. Appl. No. 12/047,896, filed Mar. 13, 2008 entitled "Reversible Polymer/Metal Nano-Composites And Method For Manufacturing Same".

Wang, Xiaorong et al., U.S. Appl. No. 12/184,895, filed Aug. 1, 2008 entitled "Disk-Like Nanoparticles".

Bohm, Georg et al., "Emerging materials: technology for new tires and other rubber products", Tire Technology International, 2006 (4 pp.).

Cui, Honggang et al., "Block Copolymer Assembly via Kinetic Control", Science, vol. 317, pp. 647-650 (Aug. 3, 2007).

Edmonds, William F. et al., "Disk Micelles from Nonionic Coil-Coil Diblock Copolymers", Macromolecules, vol. 39, pp. 4526-4530 (May 28, 2006).

Pre-print article, Wang, Xiaorong et al., "PMSE 392- Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Wang, Xiaorong et al., "Under microscopes the poly(styrene/butadiene) nanoparticles", Journal of Electron Microscopy, vol. 56, No. 6, pp. 209-216 (2007).

Wang, Xiaorong et al., "Heterogeneity of structural relaxation in a particle-suspension system", EPL, 79, 18001, pp. 1-5 (Jul. 2007).

Bridgestone Americas 2006 Presentation (14 pp.).

Sakurai, Ryo et al., "68.2: Color and Flexible Electronic Paper Display using QR-LPD Technology", SID 06 Digest, pp. 1922-1925 (2006).

Asinovsky, Olga, Jun. 20, 2006 Office Action from U.S. Appl. No. 10/791,049, filed Mar. 2, 2004 (11 pp.).

Asinovsky, Olga, Dec. 22, 2006 Office Action from U.S. Appl. No. 10/791,049, filed Mar. 2, 2004 (11 pp.).

Asinovsky, Olga, Jun. 7, 2007 Office Action from U.S. Appl. No. 10/791,049, filed Mar. 2, 2004 (11 pp.).

Asinovsky, Olga, Nov. 28, 2007 Office Action from U.S. Appl. No. 10/791,049, filed Mar. 2, 2004 (9 pp.).

Asinovsky, Olga, May 21, 2008 Office Action from U.S. Appl. No. 10/791,049, filed Mar. 2, 2004 (11 pp.).

Asinovsky, Olga, Sep. 11, 2008 Office Action from U.S. Appl. No. 10/791,049, filed Mar. 2, 2004 (12 pp.).

Ronesi, Vickey M., Jan. 8, 2007 Office Action from U.S. Appl. No. 10/791,177, filed Mar. 2, 2004 (5 pp.).

Harlan, Robert D., May 3, 2007 Office Action from U.S. Appl. No. 10/791,177, filed Mar. 2, 2004 (6 pp.).

Harlan, Robert D., Oct. 18, 2007 Office Action from U.S. Appl. No. 10/791,177, filed Mar. 2, 2004 (6 pp.).

Harlan, Robert D., May 28, 2008 Office Action from U.S. Appl. No. 10/791,177, filed Mar. 2, 2004 (8 pp.).

Kiliman, Leszek B., Sep. 9, 2005 Office Action from U.S. Appl. No. 10/817,995, filed Apr. 5, 2004 (7 pp.).

Kiliman, Leszek B., Mar. 23, 2006 Office Action from U.S. Appl. No. 10/817,995, filed Apr. 5, 2004 (7 pp.).

Kiliman, Leszek B., Dec. 13, 2006 Office Action from U.S. Appl. No. 10/817,995, filed Apr. 5, 2004 (6 pp.).

Kiliman, Leszek B., Sep. 5, 2008 Office Action from U.S. Appl. No. 10/817,995, filed Apr. 5, 2004 (5 pp.).

Wyrozebski Lee, Katarzyna I., Dec. 19, 2006 Office Action from U.S. Appl. No. 10/872,731, filed Jun. 21, 2004 (6 pp.).

Wyrozebski Lee, Katarzyna I., Mar. 7, 2007 Office Action from U.S. Appl. No. 10/872,731, filed Jun. 21, 2004 (13 pp.).

Wyrozebski Lee, Katarzyna I., Sep. 14, 2007 Office Action from U.S. Appl. No. 10/872,731, filed Jun. 21, 2004 (9 pp.).

Chevalier, Alicia Ann, Sep. 6, 2006 Office Action from U.S. Appl. No. 10/886,283, filed Jul. 6, 2004 (5 pp.).

Chevalier, Alicia Ann, Jan. 4, 2007 Office Action from U.S. Appl. No. 10/886,283, filed Jul. 6, 2004 (8 pp.).

Chevalier, Alicia Ann, Jul. 2, 2007 Office Action from U.S. Appl. No. 10/886,283, filed Jul. 6, 2004 (8 pp.).

Chevalier, Alicia Ann, Jan. 4, 2008 Office Action from U.S. Appl. No. 10/886,283, filed Jul. 6, 2004 (8 pp.).

Mullis, Jeffrey C., Oct. 31, 2006 Office Action from U.S. Appl. No. 11/050,115, filed Feb. 3, 2005 (6 pp.).

Mullis, Jeffrey C., Mar. 24, 2008 Office Action from U.S. Appl. No. 11/050,115, filed Feb. 3, 2005 (10 pp.).

Mullis, Jeffrey C., Aug. 21, 2008 Office Action from U.S. Appl. No. 11/050,115, filed Feb. 3, 2005 (7 pp.).

Lipman, Bernard., Sep. 29, 2006 Office Action from U.S. Appl. No. 11/058,156, filed Feb. 15, 2005 (5 pp.).

Raza, Saira B., Oct. 20, 2005 Office Action from U.S. Appl. No. 11/104,759, filed Apr. 13, 2005 (10 pp.).

Raza, Saira B., Aug. 21, 2006 Office Action from U.S. Appl. No. 11/104,759, filed Apr. 13, 2005 (6 pp.).

Haider, Saira Bano, May 16, 2007 Office Action from U.S. Appl. No. 11/104,759, filed Apr. 13, 2005 (9 pp.).

Haider, Saira Bano, Oct. 30, 2007 Office Action from U.S. Appl. No. 11/104,759, filed Apr. 13, 2005 (9 pp.).

Haider, Saira Bano, Jun. 12, 2008 Office Action from U.S. Appl. No. 11/104,759, filed Apr. 13, 2005 (10 pp.).

Harlan, Robert D., Nov. 7, 2005 Office Action from U.S. Appl. No. 11/117,981, filed Apr. 29, 2005 (7 pp.).

Harlan, Robert D., Jul. 20, 2006 Office Action from U.S. Appl. No. 11/117,981, filed Apr. 29, 2005 (6 pp.).

Harlan, Robert D., Jan. 26, 2007 Office Action from U.S. Appl. No. 11/117,981, filed Apr. 29, 2005 (8 pp.).

Harlan, Robert D., Jul. 12, 2007 Office Action from U.S. Appl. No. 11/117,981, filed Apr. 29, 2005 (6 pp.).

Harlan, Robert D., Jan. 2, 2008 Office Action from U.S. Appl. No. 11/117,981, filed Apr. 29, 2005 (6 pp.).

Harlan, Robert D., Jul. 25, 2008 Office Action from U.S. Appl. No. 11/117,981, filed Apr. 29, 2005 (8 pp.).

Maksymonko, John M., Feb. 20, 2008 Office Action from U.S. Appl. No. 11/305,279, filed Dec. 16, 2005 (14 pp.).

Maksymonko, John M., Aug. 6, 2008 Office Action from U.S. Appl. No. 11/305,279, filed Dec. 16, 2005 (11 pp.).

Le, Hoa T., Sep. 25, 2008 Office Action from U.S. Appl. No. 11/612,554, filed Dec. 19, 2006 (8 pp.).

Maksymonko, John M., Jun. 13, 2008 Office Action from U.S. Appl. No. 11/641,514, filed Dec. 19, 2006 (7 pp.).

Mullis, Jeffrey C., Oct. 31, 2008 Office Action from U.S. Appl. No. 11/641,514, filed Dec. 19, 2006 (10 pp.).

Maksymonko, John M., Jun. 11, 2008 Office Action from U.S. Appl. No. 11/642,124, filed Dec. 20, 2006 (16 pp.).

Maksymonko, John M., May 30, 2008 Office Action from U.S. Appl. No. 11/642,795, filed Dec. 20, 2006 (12 pp.).

Maksymonko, John M., May 28, 2008 Office Action from U.S. Appl. No. 11/642,802, filed Dec. 20, 2006 (10 pp.).
Chen, Jizhuang, Dec. 30, 2005 Office Action from Chinese Patent Application No. 02819527.2 filed Oct. 4, 2002 (9 pp.).
Chen, Jizhuang, Dec. 21, 2007 Office Action from Chinese Patent Application No. 02819527.2 filed Oct. 4, 2002 (12 pp.).
Chen, Jizhuang, Sep. 26, 2008 Office Action from Chinese Patent Application No. 02819527.2 filed Oct. 4, 2002 (4 pp.).
Schutte, M., Aug. 8, 2006 Office Action from European Patent Application No. 02807196.7 filed Oct. 4, 2002 (5 pp.).
Schutte, Maya, Sep. 3, 2007 Office Action from European Patent Application No. 02807196.7 filed Oct. 4, 2002 (2 pp.).
Watanabe, Y., May 7, 2008 Office Action from Japanese Patent Application No. 582224/2003 filed Oct. 4, 2002 (5 pp.).
Watanabe, Y., Jul. 29, 2008 Office Action from Japanese Patent Application No. 582224/2003 filed Oct. 4, 2002 (17 pp.).
May 30, 2008 International Search Report from PCT Patent Application No. PCT/US2007/026031 filed Dec. 19, 2007 (4 pp.).
May 27, 2008 International Search Report from PCT Patent Application No. PCT/US2007/087869 filed Dec. 18, 2007 (4 pp.).
Aug. 25, 2008 International Search Report from PCT Patent Application No. PCT/US2008/068838 filed Jun. 30, 2008 (4 pp.).
Lipman, Bernard, Mar. 26, 2002 Notice of Allowance from U.S. Appl. No. 09/970,830, filed Oct. 4, 2001 (4 pp.).
Kiliman, Leszek B., Feb. 13, 2003 Office from U.S. Appl. No. 10/038,748, filed Dec. 31, 2001 (3 pp.).
Kiliman, Leszek B., Aug. 25, 2003 Notice of Allowance from U.S. Appl. No. 10/038,748, filed Dec. 31, 2001 (5 pp.).
Harlan, Robert D., Mar. 17, 2004 Restriction/Election Office Action from U.S. Appl. No. 10/223,393, filed Aug. 19, 2002 (6 pp.).
Harlan, Robert D., Jun. 22, 2004 Office Action from U.S. Appl. No. 10/223,393, filed Aug. 19, 2002 (6 pp.).
Harlan, Robert D., Jan. 3, 2005 Notice of Allowance from U.S. Appl. No. 10/223,393, filed Aug. 19, 2002 (6 pp.).
Lipman, Bernard, Mar. 25, 2004 Restriction/Election Office Action from U.S. Appl. No. 10/331,841, filed Dec. 30, 2002 (6 pp.).
Lipman, Bernard, Nov. 18, 2004 Notice of Allowance from U.S. Appl. No. 10/331,841, filed Dec. 30, 2002 (5 pp.).
Lipman, Bernard, Mar. 24, 2004 Restriction/Election Office Action from U.S. Appl. No. 10/345,498, filed Jan. 16, 2003 (5 pp.).
Lipman, Bernard, Nov. 23, 2004 Notice of Allowance from U.S. Appl. No. 10/345,498, filed Jan. 16, 2003 (5 pp.).
Choi, Ling Siu, Mar. 24, 2006 Office Action from U.S. Appl. No. 10/755,648, filed Jan. 12, 2004 (11 pp.).
Choi, Ling Siu, Dec. 4, 2006 Notice of Allowance from U.S. Appl. No. 10/755,648, filed Jan. 12, 2004 (9 pp.).
Asinovsky, Olga, Aug. 16, 2007 Advisory Action from U.S. Appl. No. 10/791,049, filed Mar. 2, 2004 (2 pp.).
Asinovsky, Olga, Jul. 29, 2008 Advisory Action from U.S. Appl. No. 10/791,049, filed Mar. 2, 2004 (3 pp.).
Harlan, Robert D., Jan. 9, 2008 Advisory Action from U.S. Appl. No. 10/791,177, filed Mar. 2, 2004 (3 pp.).
Harlan, Robert D., Mar. 7, 2008 Advisory Action from U.S. Appl. No. 10/791,177, filed Mar. 2, 2004 (3 pp.).
Le, Hoa T., Dec. 14, 2004 Office Action from U.S. Appl. No. 10/791,491, filed Mar. 2, 2004 (5 pp.).
Le, Hoa T., Jul. 5, 2005 Office Action from U.S. Appl. No. 10/791,491, filed Mar. 2, 2004 (9 pp.).
Le, Hoa T., Apr. 10, 2006 Notice of Allowance from U.S. Appl. No. 10/791,491, filed Mar. 2, 2004 (5 pp.).
Kiliman, Leszak B., May 15, 2007 Advisory Action from U.S. Appl. No. 10/817,995, filed Apr. 5, 2004 (2 pp.).

Kiliman, Leszak B., Apr. 2, 2008 Notice of Allowance from U.S. Appl. No. 10/817,995, filed Apr. 5, 2004 (5 pp.).
Mullis, Jeffrey C., Nov. 5, 2008 Advisory Action form U.S. Appl.No. 11/050,115, filed Feb. 3, 2005 (4 pp.).
Lipman, Bernard, May 21, 2007 Notice of Allowance from U.S. Appl. No. 11/058,156, filed Feb. 15, 2005 (3 pp.).
Lipman, Bernard, Aug. 28, 2007 Notice of Allowance from U.S. Appl. No. 11/058,156, filed Feb. 15, 2005 (5 pp.).
Lipman, Bernard, Feb. 28, 2008 Notice of Allowance from U.S. Appl. No. 11/058,156, filed Feb. 15, 2005 (5 pp.).
Lipman, Bernard, May 29, 2008 Notice of Allowance from U.S. Appl. No. 11/058,156, filed Feb. 15, 2005 (5 pp.).
Lipman, Bernard, Oct. 3, 2006 Notice of Allowance from U.S. Appl. No. 11/064,234, filed Feb. 22, 2005 (5 pp.).
Haider, Saira Bano, Dec. 22, 2006 Advisory Action from U.S. Appl. No. 11/104,759, filed Apr. 13, 2005 (3 pp.).
Haider, Saira Bano, Mar. 19, 2008 Advisory Action from U.S. Appl. No. 11/104,759, filed Apr. 13, 2005 (3 pp.).
Haider, Saira Bano, Dec. 2, 2008 Office Action from U.S. Appl. No. 11/104,759, filed Apr. 13, 2005 (10 pp.).
Lipman, Bernard, Sep. 14, 2006 Office Action from U.S. Appl. No. 11/168,297, filed Jun. 29, 2005 (4 pp.).
Lipman, Bernard, Mar. 2, 2007 Notice of Allowance from U.S. Appl. No. 11/168,297, filed Jun. 29, 2005 (3 pp.).
Lipman, Bernard, Apr. 18, 2007 Supplemental Notice of Allowability from U.S. Appl. No. 11/168,297, filed Jun. 29, 2005 (3 pp.).
Lipman, Bernard, Mar. 20, 2008 Office Action from U.S. Appl. No. 11/764,607, filed Jun. 18, 2007 (4 pp.).
Lipman, Bernard, Sep. 25, 2008 Notice of Allowance from U.S. Appl. No. 11/764,607, filed Jun. 18, 2007 (3 pp.).
Russell, Graham, Nov. 4, 2008 Office Action from European Patent Application No. 05742316.2 filed Mar. 28, 2005 (2 pp.).
Schutte, M., Nov. 13, 2003 International Search Report from PCT Patent Application No. PCT/US02/31817 filed Oct. 4, 2002 (3 pp.).
Schutte, M., May 28, 2004 International Search Report from PCT Patent Application No. PCT/US03/40375 filed Dec. 18, 2003 (3 pp.).
Iraegui Retolaza, E., Jul. 9, 2004 International Search Report from PCT Patent Application No. PCT/US2004/001000 filed Jan. 15, 2004 (3 pp.).
Russell, G., Aug. 1, 2005 International Search Report from PCT Patent Application No. PCT/US2005/010352 filed Mar. 28, 2005 (3 pp.).
Mettler, Rolf-Martin, May 27, 2008 International Search Report from PCT Patent Application No. PCT/US2007/087869 filed Dec. 18, 2007 (2 pp.).
Iraegui Retolaza, E., May 30, 2008 International Search Report from PCT Patent Application No. PCT/US2007/026031 filed Dec. 19, 2007 (3 pp.).
Lipman, Bernard, Notice of Allowance dated Jan. 14, 2009 from U.S. Appl. No. 11/058,156 (5 pp.).
Harlan, Robert D., Office Action dated Jan. 9, 2009 from U.S. Appl. No. 11/117,981 (6 pp.).
Cain, Edward J., Notice of Allowance dated Dec. 31, 2008 from U.S. Appl. No. 11/642,124 (5 pp.).
Lipman, Bernard, Notice of Allowance dated Jan. 27, 2009 from U.S. Appl. No. 11/764,607 (4 pp.).
Johnson, Edward M., International Search Report dated Dec. 12, 2008 from PCT Application No. PCT/US07/74611 (5 pp.).
Wang, Xiaorong et al., U.S. Appl. No. 12/374,883 international filing date Jul. 27, 2007, entitled "Polymeric Core-Shell Nanoparticles with Interphase Region".

NANOPARTICLES WITH CONTROLLED ARCHITECTURE AND METHOD THEREOF

BACKGROUND OF THE INVENTION

The present invention is generally related to polymer nanoparticles. More particularly, the present invention provides polymer nanoparticles with a controlled architecture of nano-necklace, nano-cylinder, nano-ellipsoid, or nano-sphere, as examples. The present invention also provides a method of preparing the polymer nanoparticles and a rubber article including a formulation comprising the polymer nanoparticles.

Tires are often subjected to rough road conditions that produce repetitive, localized high-pressure pounding on the tire. These stresses can cause fatigue fracture and lead to crack formation and crack growth. This degradation of the tire has also been referred to as chipping or chunking of the tread surface or base material. In an attempt to prevent this degradation, it is known to add reinforcements such as carbon black, silicas, silica/silanes, or short fibers into the tire formulation. Silica has been found advantageous due to its ability to deflect and suppress cut prolongation, while silanes have been added to bind the silica to unsaturated elastomers. The fibers that have been added include nylon and aramid fibers.

It is also known that the addition of polyolefins to rubber compositions can provide beneficial properties. For example, low molecular weight high density polyethylene, and high molecular weight, low density polyethylene, are known to improve the tear strength of polybutadiene or natural rubber vulcanizates. In the tire art, it has also been found that polyethylene increases the green, tear strength of carcass compounds and permits easy extrusion in calendaring without scorch. Polypropylene likewise increases the green strength of butyl rubber. Polypropylene has also been effective in raising the static and dynamic modulus of rubber, as well as its tear strength. Over the past several years, polymer nanoparticles have attracted increased attention not only in the technical fields such as catalysis, combinatorial chemistry, protein supports, magnets, and photonics, but also in the manufacture of rubbery products such as tires. For example, nano-particles can modify rubbers by uniformly dispersing throughout a host rubber composition as discrete particles. The physical properties of rubber such as moldability and tenacity can often be improved through such modifications. Moreover, some nano-particles such as polymer nano-strings may serve as a reinforcement material for rubber in order to overcome the above-mentioned drawbacks associated with polyolefin and silica reinforcement. For example, polymer nano-strings are capable of dispersing evenly throughout a rubber composition, while maintaining a degree of entanglement between the individual nano-strings, leading to improved reinforcement. However, indiscriminate addition of nano-particles to rubber may cause degradation of the matrix rubber material.

Advantageously, the present invention provides methods for preparation of polymer nanoparticles with well-controlled architectures such as nano-necklace, nano-cylinder, nano-ellipsoid, and nano-sphere. The polymer nanoparticles may be used as, for example, additives for rubber products.

BRIEF DESCRIPTION OF THE INVENTION

One aspect of the present invention provides polymer nanoparticles with a controlled architecture selected from the group consisting of nano-necklace, nano-cylinder, nano-ellipsoid, and nano-sphere. The polymer nanoparticle comprises a core polymerized from multiple-vinyl-substituted aromatic hydrocarbons, a shell polymerized from alkyl-substituted styrene, and a polystyrene layer between the core and the shell.

Another aspect of the invention provides a method of preparing polymer nanoparticles with a controlled architecture selected from the group consisting of nano-necklace, nano-cylinder, nano-ellipsoid, and nano-sphere.

A further aspect of the invention provides a rubber article including a formulation comprising the polymer nanoparticles with a controlled architecture selected from the group consisting of nano-necklace, nano-cylinder, nano-ellipsoid, and nano-sphere.

BRIEF DESCRIPTION OF THE DRAWINGS

The drawings are only for purposes of illustrating preferred embodiments and are not to be construed as limiting the invention. In the drawings appended hereto.

DETAILED DESCRIPTION OF ILLUSTRATIVE EMBODIMENTS

Figure 1:
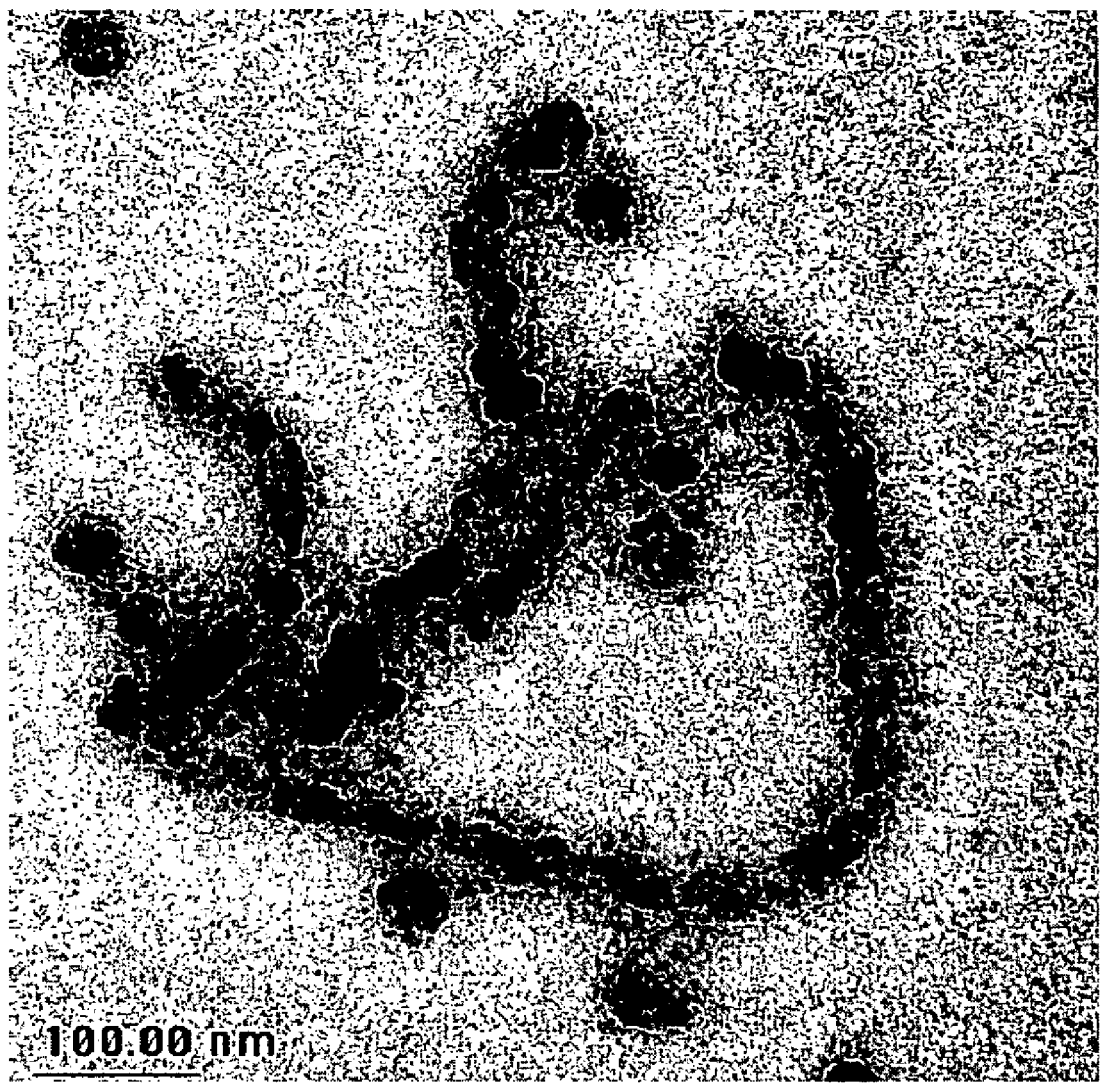
FIG. 1 is a transmission electron microscopy (TEM) photograph of polymer nanoparticles with controlled architecture of nano-necklace in an embodiment of the invention.

It is to be understood herein, that if a "range" or "group" is mentioned with respect to a particular characteristic of the present invention, for example, molecular weight, ratio, percentage, chemical group, and temperature etc., it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-range or sub-group encompassed therein; and similarly with respect to any sub-ranges or sub-groups therein.

The present invention provides polymer nanoparticles with controlled architecture. The controlled architecture of the polymer nanoparticle may be nano-necklace, nano-cylinder, nano-ellipsoid, or nano-sphere. The nanoparticle comprises a core polymerized from multiple-vinyl-substituted aromatic hydrocarbons; a shell polymerized from alkyl-substituted styrene; and a polystyrene layer between the core and the shell.

The polymer nanoparticles with controlled architecture can be formed by dispersion polymerization, although emulsion polymerization may also be contemplated. In preferred exemplary embodiments, the method of the invention comprises a multi-stage anionic polymerization. Multi-stage anionic polymerizations have been conducted to prepare block-copolymers, for example in U.S. Pat. No. 4,386,125, which is incorporated herein by reference.

The polymer nanoparticles with controlled architecture are formed from diblock copolymer chains having a poly(alkyl-substituted styrene) block and a polystyrene block. Living polystyrene blocks may be crosslinked with a multiple-vinyl-substituted aromatic hydrocarbon to form the desired polymer nanoparticles with controlled architecture. The polymer nanoparticles preferably retain their discrete nature with little or no polymerization between each other. In preferred embodiments, the nanoparticles are substantially monodisperse and uniform in shape.

The liquid hydrocarbon medium can function as the dispersion solvent, and may be selected from any suitable aliphatic hydrocarbons, alicyclic hydrocarbons, or mixture thereof, with a proviso that it exists in liquid state during the nanoparticles' formation procedure. Exemplary aliphatic hydrocarbons include, but are not limited to, pentane, isopentane, 2,2 dimethyl-butane, hexane, heptane, octane, nonane, decane, and the like. Exemplary alicyclic hydrocarbons include, but are not limited to, cyclopentane, methyl cyclopentane, cyclohexane, methyl cyclopentane, cycloheptane, cyclooctane, cyclononane, cyclodecane, and the like. Generally, aromatic hydrocarbons and polar solvents are not preferred as the liquid medium. In exemplified embodiments, the liquid hydrocarbon medium comprises hexane.

The alkyl-substituted styrene monomer may have a structure represented by the formula as shown below:

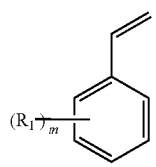

in which m in an integer and $1 \leq m \leq 5$, preferably m is 1 or 2; and $R_1$ may be selected from saturated or unsaturated, substituted or unsubstituted, straight or branched, cyclic or acyclic $C_3$-$C_8$ alkyl groups. Typically, styrenes with polar groups such as chloride substituents are not used in anionic polymerization.

The alkyl-substituted styrene monomer(s) may be selected from one or more of the compounds as shown below:

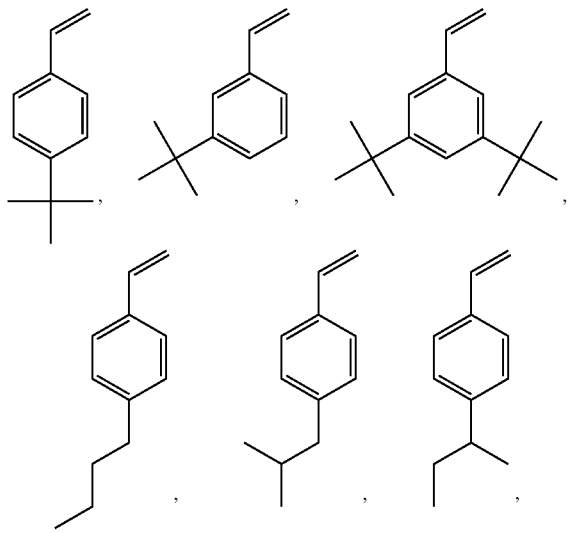

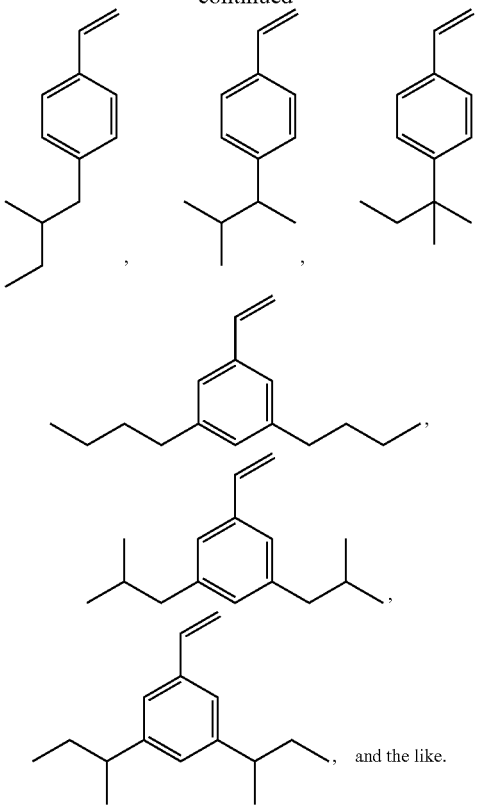

, and the like.

The alkyl-substituted styrene monomer can comprise tert-butyl styrene (TbST) such as para-tert-butyl styrene as shown below:

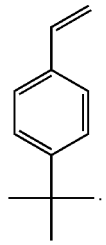

Without being bound to any theory, it is believed that the alkyl group in the alkyl-substituted styrene monomer renders the poly(alkyl-substituted styrene) block more soluble or miscible in a selected liquid hydrocarbon medium than the polystyrene block, facilitating the subsequent micelle assembling and nanoparticle formation from the poly(alkyl-substituted styrene-co-styrene) diblock living polymers.

The polymerizing of alkyl-substituted styrene monomers into a poly(alkyl-substituted styrene) block is initiated via addition of anionic initiators that are known in the art. For example, the anionic initiator can be selected from any known organolithium compounds. Suitable organolithium compounds are represented by the formula as shown below:

$$R(Li)_x$$

wherein R is a hydrocarbyl group having 1 to x valence(s). R generally contains 1 to 20, preferably 2-8, carbon atoms per R group, and x is an integer of 1-4. Typically, x is 1, and the R group includes aliphatic radicals and cycloaliphatic radicals, such as alkyl, cycloalkyl, cycloalkylalkyl, alkylcycloalkyl, alkenyl, as well as aryl and alkylaryl radicals.

Specific examples of R groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

Other lithium initiators include, but are not limited to, 1,4-dilithiobutane, 1,5-dilithiopetane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like. Preferred lithium initiators include n-butyllithium, sec-butyllithium, tert-butyllithium, 1,4-dilithiobutane, and mixtures thereof.

Other lithium initiators which can be employed are lithium dialkyl amines, lithium dialkyl phosphines, lithium alkyl aryl phosphines and lithium diaryl phosphines. Functionalized lithium initiators are also contemplated as useful in the present invention. Preferred functional groups include amines, formyl, carboxylic acids, alcohol, tin, silicon, silyl ether and mixtures thereof.

In selected embodiments, n-butyllithium, sec-butyllithium, tert-butyllithium, or mixture thereof are used to initiate the polymerization of alkyl-substituted styrene monomers into a poly(alkyl-substituted styrene) block.

The polymerizing of alkyl-substituted styrene monomers into a poly(alkyl-substituted styrene) block may last until the reaction is completed and a predetermined degree of polymerization $DP_1$ is obtained. The polymerization reaction of this step may last typically from about 0.5 hours to about 24 hours, preferably from about 0.5 hours to about 10 hours, more preferably from about 0.5 hours to about 4 hours.

The anionic polymerization of the invention may be conducted in the presence of a modifier, so as to, for example, increase the reaction rate and equalize the reactivity ratio of monomers. The modifiers used in the present invention may be linear oxalanyl oligomers represented by the structural formula (IV) and cyclic oligomers represented by the structural formula (V), as shown below:

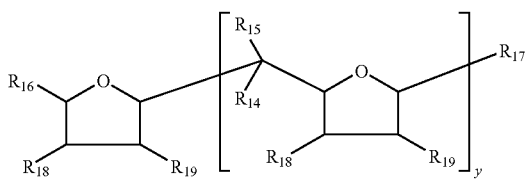

Formula (IV)

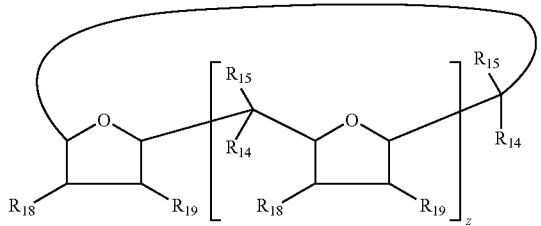

Formula (V)

wherein $R_{14}$ and $R_{15}$ are independently hydrogen or a $C_1$-$C_8$ alkyl group; $R_{16}$, $R_{17}$, $R_{18}$, and $R_{19}$ are independently hydrogen or a $C_1$-$C_6$ alkyl group; y is an integer of 1 to 5 inclusive, and z is an integer of 3 to 5 inclusive.

Specific examples of modifiers include, but are not limited to, oligomeric oxolanyl propanes (OOPs); 2,2-bis-(4-methyl dioxane); bis(2-oxolanyl) methane; 1,1-bis(2-oxolanyl) ethane; bistetrahydrofuryl propane; 2,2-bis(2-oxolanyl) propane; 2,2-bis(5-methyl-2-oxolanyl) propane; 2,2-bis-(3,4,5-trimethyl-2-oxolanyl) propane; 2,5-bis(2-oxolanyl-2-propyl) oxolane; octamethylperhydrocyclotetrafurfurylene (cyclic tetramer); 2,2-bis(2-oxolanyl) butane; and the like. A mixture of two or more 1,2-microstructure controlling agents also can be used. The preferred modifiers for use in the present invention are oligomeric oxolanyl propanes (OOPs).

Other suitable modifiers are hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphepyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, and tetramethylenediamine etc. A mixture of one or more modifiers also can be used.

The poly(alkyl-substituted styrene) block is polymerized first, followed by polystyrene block, positioning the living end of the diblock polymer on polystyrene block to facilitate later crosslinking.

In copolymerizing styrene monomers with the poly(alkyl-substituted styrene) block to produce a polystyrene block with a predetermined degree of polymerization $DP_2$ to obtain a diblock copolymer, i.e. poly(alkyl-substituted styrene-co-styrene), the polymerization time for this step may last typically from about 0.5 hours to about 24 hours, preferably from about 0.5 hours to about 10 hours, more preferably from about 0.5 hours to about 4 hours.

A micelle-like structure may be formed by aggregating the poly(alkyl-substituted styrene-co-styrene)s. The polystyrene blocks are typically directed toward the center of the micelle and the poly(alkyl-substituted styrene) blocks are typically extended away from the center.

A multiple-vinyl-substituted aromatic hydrocarbon may then be copolymerized with the polystyrene block of the diblock copolymers in the micelle-like structures to crosslink the diblock copolymers and to form polymer nanoparticles with controlled architecture. Preferably, the multiple-vinyl-substituted aromatic hydrocarbon has a higher affinity with the polystyrene block than with the poly(alkyl-substituted styrene) blocks. As such, the multiple-vinyl-substituted aromatic hydrocarbon is able to migrate to the center of the micelles, and crosslink the center core of the micelle to form the polymer nanoparticles with controlled architecture. Consequently, the polymer nanoparticles with controlled architecture are formed from the micelles with a core made from multiple-vinyl-substituted aromatic hydrocarbons, a shell made from alkyl-substituted styrene, and a polystyrene layer between the core and the shell.

The multiple-vinyl-substituted aromatic hydrocarbon has a formula as shown below:

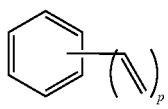

in which p is an integer and $2 \leq p \leq 6$, preferably, p is 2 or 3, more preferably p is 2, i.e. di-vinyl-benzene (DVB).

In certain embodiments, the di-vinyl-benzene may be selected from any one of the following isomers or any combination thereof:

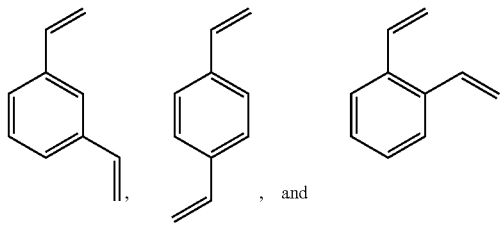

In copolymerizing a multiple-vinyl-substituted aromatic hydrocarbon with the polystyrene block of the diblock copolymers in the micelles to crosslink the diblock copolymers and to form polymer nanoparticles with controlled architecture, the copolymerization time for this step may last typically from about 0.5 hours to about 24 hours, preferably from about 0.5 hours to about 10 hours, more preferably from about 0.5 hours to about 4 hours.

The polymer nano-particles of the invention are similar to star polymers. A star polymer is a polymer comprised of star macromolecules. A star macromolecule is a macromolecule containing a single branch point from which linear chains (arms) emanate.

The polymerization reactions used to prepare the polymer nanoparticles with controlled architecture may be terminated with a terminating agent. Suitable terminating agents include, but are not limited to, alcohols such as methanol, ethanol, propanol, and isopropanol; amines, $MeSiCl_3$, $Me_2SiCl_2$, $Me_3SiCl$, $SnCl_4$, $MeSnCl_3$, $Me_2SnCl_2$, $Me_3SnCl$, and etc. In exemplified embodiments, the polymerization reaction mixture was cooled down and dropped in an isopropanol/acetone solution optionally containing an antioxidant such as butylated hydroxytoluene (BHT). The isopropanol/acetone solution may be prepared by mixing 1 part by volume of isopropanol and 4 parts by volume of acetone.

In the following four sections, specific conditions for the preparation of nanoparticles with controlled architecture of nano-necklace, nano-cylinder, nano-ellipsoids or nano-spheres will be described in details.

(I) Nano-Necklaces

In some exemplary embodiments, the controlled architecture of the polymer nanoparticle is in the shape of nano-necklace. The mean diameter of the necklace may be broadly within the range of from about 5 nm to about 100 nm, preferably within the range of from about 5 nm to about 60 nm, more preferably within the range of from about 10 nm to about 40 nm, and most preferably within the range of from about 30 nm to about 40 nm. The length of the necklace may be broadly within the range of from about 0.1 µm to about 1,000 µm, preferably within the range of from about 0.1 µm to about 100 µm, more preferably within the range of from about 0.1 µm to about 10 µm, and most preferably within the range of from about 0.1 µm to about 5 µm.

In preparing the nano-necklaces, the predetermined degree of polymerization $DP_1$ of the poly(alkyl-substituted styrene) block may be broadly within the range of from about 20 to about 1,000, preferably within the range of from about 50 to about 300, more preferably within the range of from about 70 to about 100, and most preferably within the range of from about 70 to about 90. Alternatively, the number average molecular weight ($Mn_1$) of the poly(alkyl-substituted styrene) block may be controlled within the range of from about 3,000 to about 150,000, more preferably within the range of from about 8,000 to about 50,000, and most preferably within the range of from about 10,000 to about 15,000.

In preparing the nano-necklaces, the predetermined degree of polymerization $DP_2$ of the polystyrene block may be broadly within the range of from about 20 to about 1,500, preferably within the range of from about 40 to about 1,000, more preferably within the range of from about 100 to about 1,000, and most preferably within the range of from about 200 to about 500. Alternatively, the number average molecular weight ($Mn_2$) of the polystyrene block may be controlled within the range of from about 2,000 to about 150,000, more preferably within the range of from about 4,000 to about 100,000, and most preferably within the range of from about 20,000 to about 50,000.

When copolymerizing multiple-vinyl-substituted aromatic hydrocarbons with the polystyrene blocks of the poly(alkyl-substituted styrene-co-styrene) to crosslink the diblock copolymers and to form the nano-necklaces, the weight concentration of the poly(alkyl-substituted styrene-co-styrene) in the liquid hydrocarbon medium may be broadly within the range of from about 30% to about 90%, preferably within the range of from about 30% to about 80%, more preferably within the range of from about 30% to about 70%, and most preferably within the range of from about 30% to about 60%. The weight concentration of the multiple-vinyl-substituted aromatic hydrocarbon such as DVB in the liquid hydrocarbon medium may be broadly within the range of from about 1% to about 10%, preferably within the range of from about 1% to about 8%, more preferably within the range of from about 2% to about 6%, and most preferably within the range of from about 3% to about 6%.

In a variety of exemplary embodiments, the process of preparing the polymer nanoparticles with controlled architecture of nano-necklace may be conducted at a temperature of from about 50° F. to about 400° F., preferably form about 50° F. to about 300° F., and more preferably form about 70° F. to about 150° F.

(II) Nano-Cylinders

In some exemplary embodiments, the controlled architecture of the polymer nanoparticle is in the shape of nano-cylinders. The mean diameter of the cylinders may be broadly within the range of from about 5 nm to about 100 nm, preferably within the range of from about 5 nm to about 60 nm, more preferably within the range of from about 10 nm to about 50 nm, and most preferably within the range of from about 35 nm to about 45 nm. The length of the cylinder may be broadly within the range of from about 200 nm to about 5 µm, preferably within the range of from about 200 nm to about 1 µm, more preferably within the range of from about 200 nm to about 0.5 µm, and most preferably within the range of from about 200 nm to about 0.25 µm. The average length of the cylinder may also be from about 0.15 µm to about 0.25 µm.

In preparing the nano-cylinders, the predetermined degree of polymerization $DP_1$ of the poly(alkyl-substituted styrene) block may be broadly within the range of from about 20 to about 1,000, preferably within the range of from about 50 to about 300, more preferably within the range of from about 70 to about 100, and most preferably within the range of from about 70 to about 90. Alternatively, the number average molecular weight ($Mn_1$) of the poly(alkyl-substituted styrene) block may be controlled within the range of from about 3,000 to about 150,000, more preferably within the range of from about 8,000 to about 50,000, and most preferably within the range of from about 10,000 to about 15,000.

In preparing the nano-cylinders, the predetermined degree of polymerization $DP_2$ of the polystyrene block may be broadly within the range of from about 20 to about 1,500, preferably within the range of from about 40 to about 1,000, more preferably within the range of from about 100 to about 1,000, and most preferably within the range of from about 200 to about 500. Alternatively, the number average molecular weight ($Mn_2$) of the polystyrene block may be controlled within the range of from about 2,000 to about 150,000, more preferably within the range of from about 4,000 to about 100,000, and most preferably within the range of from about 20,000 to about 50,000.

When copolymerizing multiple-vinyl-substituted aromatic hydrocarbons with the polystyrene blocks of the poly(alkyl-substituted styrene-co-styrene) to crosslink the diblock copolymers and to form the nano-cylinders, the w eight concentration of the living poly(alkyl-substituted styrene-co-styrene) in the liquid hydrocarbon medium may be broadly within the range of from about 25% to about 30%. The weight concentration of the multiple-vinyl-substituted aromatic hydrocarbon such as DVB in the liquid hydrocarbon medium may be broadly Within the range of from about 1% to about 10%, preferably within the range of from about 1% to about 5%, more preferably within the range of from about 1% to about 4%, and most preferably within the range of from about 1% to about 3%.

In a variety of exemplary embodiments, the process of preparing the polymer nanoparticles with controlled architecture of a nano-cylinder may be conducted at a temperature of from about 50° F. to about 400° F., preferably form about 50° F. to about 300° F., and more preferably form about 70° F. to about 150° F.

(III) Nano-Spheres

In some exemplary embodiments, the controlled architecture of the polymer nanoparticle is in the shape of nano-spheres. The mean diameter of the spheres may be broadly within the range of from about 5 nm to about 200 nm, preferably within the range of from about 5 nm to about 100 nm, more preferably within the range of from about 5 nm to about 40 nm, and most preferably within the range of from about 25 nm to about 35 nm.

In preparing the nano-spheres, the predetermined degree of polymerization $DP_1$ of the poly(alkyl-substituted styrene) block may be broadly within the range of from about 20 to about 2,000, preferably within the range of from about 50 to about 300, more preferably within the range of from about 50 to about 100, and most preferably within the range of from about 70 to about 90. Alternatively, the number average molecular weight ($Mn_1$) of the poly(alkyl-substituted styrene) block may be controlled within the range of from about 3,000 to about 300,000, more preferably within the range of from about 8,000 to about 50,000, and most preferably within the range of from about 10,000 to about 15,000.

In preparing the nano-spheres, the predetermined degree of polymerization $DP_2$ of the polystyrene block may be broadly within the range of from about 20 to about 3,000, preferably within the range of from about 40 to about 1,000, more preferably within the range of from about 100 to about 1,000, and most preferably within the range of from about 150 to about 500. Alternatively, the number average molecular weight ($Mn_2$) of the polystyrene block may be controlled within the range of from about 2,000 to about 300,000, more preferably within the range of from about 4,000 to about 100,000, and most preferably within the range of from about 15,000 to about 50,000.

When copolymerizing multiple-vinyl-substituted aromatic hydrocarbons with the polystyrene blocks of the poly(alkyl-substituted styrene-co-styrene) to crosslink the diblock copolymers and to form the nano-spheres, the weight concentration of the poly(alkyl-substituted styrene-co-styrene) in the liquid hydrocarbon medium ($M_1$) may be broadly within the range of from about 1% to about 25%, preferably within the range of from about 5% to about 25%, more preferably within the range of from about 6% to about 25%, and most preferably within the range of from about 10% to about 25%. The weight concentration of the multiple-vinyl-substituted aromatic hydrocarbon such as DVB in the liquid hydrocarbon medium ($M_2$) may be broadly within the range of from about 1% to about 10%, preferably within the range of from about 1% to about 5%, more preferably within the range of from about 1% to about 4%, and most preferably within the range of from about 1% to about 3%.

In a variety of exemplary embodiments, the process of preparing the polymer nanoparticles with controlled architecture of nano-sphere may be conducted at a temperature of from about 50° F. to about 400° F., preferably form about 50° F. to about 300° F., and more preferably form about 70° F. to about 159° F.

(IV) Nano-Ellipsoid

In some exemplary embodiments, the controlled architecture of the polymer nanoparticle is in the shape of nano-ellipsoids. The average length of the major axis of the ellipsoids may be broadly within the range of from about 5 nm to about 200 nm, preferably within the range of from about 10 nm to about 100 nm, more preferably within the range of from about 10 nm to about 80 nm, and most preferably within the range of from about 10 nm to about 60 nm. The average length of the minor axis of the ellipsoids may be broadly within the range of from about 10 nm to about 100 nm, preferably within the range of from about 10 nm to about 80 nm, more preferably within the range of from about 10 nm to about 70 nm, and most preferably within the range of from about 20 nm to about 60 nm.

In preparing the nano-ellipsoids, the predetermined degree of polymerization $DP_1$ of the poly(alkyl-substituted styrene) block may be broadly within the range of from about 20 to about 2,000, preferably within the range of from about 50 to about 300, more preferably within the range of from about 50 to about 200, and most preferably within the range of from about 140 to about 190. Alternatively, the number average molecular weight ($Mn_1$) of the poly(alkyl-substituted styrene) block may be controlled within the range of from about 3,000 to about 300,000, more preferably within the range of from about 8,000 to about 50,000, and most preferably within the range of from about 22,000 to about 30,000.

In preparing the nano-ellipsoids, the predetermined degree of polymerization $DP_2$ of the polystyrene block may be broadly within the range of from about 20 to about 3,000, preferably within the range of from about 40 to about 1,000, more preferably within the range of from about 100 to about 1,000, and most preferably within the range of from about 200 to about 300. Alternatively, the number average molecular weight ($Mn_2$) of the polystyrene block may be controlled within the range of from about 2,000 to about 300,000, more preferably within the range of from about 4,000 to about 100,000, and most preferably within the range of from about 20,000 to about 30,000.

When copolymerizing multiple-vinyl-substituted aromatic hydrocarbons with the polystyrene blocks of the poly(alkyl-substituted styrene-co-styrene) to crosslink the diblock copolymers and to form the nano-spheres, the weight concentration of the poly(alkyl-substituted styrene-co-styrene) in the liquid hydrocarbon medium may be broadly within the range of from about 10% to about 25%, preferably within the range of from about 15% to about 25%, more preferably within the range of from about 15% to about 20%, and most preferably within the range of from about 16% to about 18%. The weight concentration of the multiple-vinyl-substituted aromatic hydrocarbon such as DVB in the liquid hydrocarbon medium ($M_2$) may be broadly within the range of from about 1% to about 10%, preferably within the range of from about 1% to about 5%, more preferably within the range of from about 1% to about 3%, and most preferably within the range of from about 1% to about 2%.

In a variety of exemplary embodiments, the process of preparing the polymer nanoparticles with controlled architecture of nano-ellipsoid may be conducted at a temperature of from about 50° F. to about 400° F., preferably form about 70° F. to about 300° F., and more preferably form about 70° F. to about 150° F.

The polymer nanoparticles with controlled architecture of the invention and the method thereof may be widely utilized in the technical fields of rubbers, plastics, tire manufacture, medicine, catalysis, combinatorial chemistry, protein supports, magnets, photonics, electronics, cosmetics, and all other applications envisioned by the skilled artisan. For example, they can be used as processing aids and reinforcing fillers. Monodisperse polymer particles having a particle size above 2 microns are used as a reference standard for the calibration of various instruments, in medical research and in medical diagnostic tests.

In a variety of exemplary embodiments, rubber articles such as tires may be manufactured from a formulation comprising the polymer nanoparticles as described supra. References for this purpose may be made to, for example, U.S. patent application 2004/0143064 A1.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

A 2-gallon reactor equipped with external jacked heating and internal agitation was used for all the preparations. Styrene in hexane (32.8 weight percent styrene), hexane, butyllithium (1.68 M) and BHT were used as supplied in the reactor room. Technical grade divinylbenzene (80%, mixture of isomers, purchased from Aldrich, item 41,456-5) was stored on aluminum oxide beads and calcium hydride under nitrogen. t-Butylstyrene (95% purchased from Aldrich, item 15669-8) was also stored on aluminum oxide beads and calcium hydride under nitrogen.

Example 1

The reactor was charged with 1 lbs. hexane and 0.45 lbs. t-butylstyrene (TbST). The jacket of the reactor was heated to 130° F. When the batch reached 130° F., 3.0 ml of 1.6 M oops/hexane solution and 10 ml of 1.68 M butyl lithium/hexane solution were added. The polymerization exothermed after 5 minutes of reaction. After 1.5 hours, 3.0 lb. styrene/Hexane blend (containing 32.8 wt % styrene) were added to the reactor that was still maintaining at 130° F. An exothermic peak was observed after 10 minutes. After 1.5 hours, a sample was taken for GPC analysis. Then, 100 ml of divinylbenzene was added to the reaction mixture. After another 1.5 hours of reaction, the reaction mixture was cooled down and dropped in an isopropanol/acetone solution (about 500 mL/2 L) containing BHT. The solid was then filtered through cheesecloth and dried in vacuum.

Figure 2:
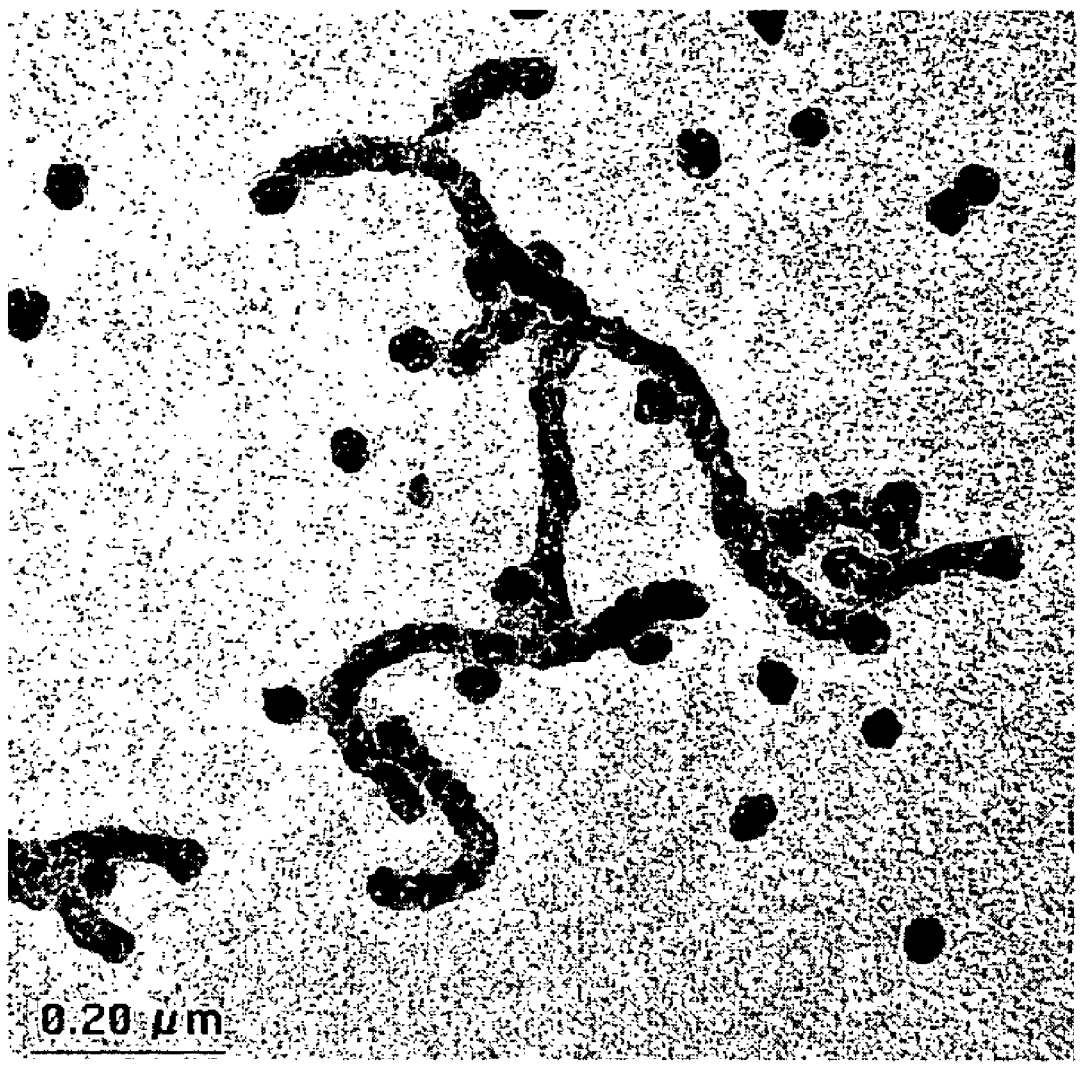
FIG. 2 is a TEM photograph of polymer nanoparticles with controlled architecture of nano-necklace in an embodiment of the invention.

GPC analysis of the intermediate product, based on a polystyrene/THF standard, indicated that ST-TBST block copolymer had the mean molecular weight (Mn) of 36600 with MW/Mn=1.07. The TEM analysis was taken on a hexane solution of the final product at $10^{-4}$ wt % concentration. A drop of the diluted solution was coated on a graphed copper micro-grid. After the solvent was vaporized, the grid was stained with $RuO_4$ and was then examined by TEM. The results showed that the product synthesized contains nano-sized necklaces (see FIGS. 1 and 2). The mean diameter of the necklace is about 30 to 40 nm, but the length can be up to several micrometers. The necklaces can be separated using physical precipitation or centrifuge methods.

Example 2

The reactor was charged with 2 lbs. hexane and 0.45 lbs. t-butylstyrene (TbST). The jacket of the reactor was heated to 130° F. When the batch reached 130° F., 3.0 ml of 1.6 M oops/hexane solution and 10 ml of 1.68 M butyl lithium/hexane solution were added. The polymerization showed an exothermic peak after 5 minutes of reaction. After 1.5 hours, 3.0 lb. styrene/Hexane blend (containing 32.8 wt % styrene) were added to the reactor that was still maintaining at 130° F. An exothermic peak was observed after 10 minutes. After 1.5 hours, a sample was taken for GPC analysis. Then, 60 ml of divinylbenzene was added to the reaction mixture. After another 1.5 hours of reaction, the reaction mixture was cooled down and dropped in an isopropanol/acetone solution (about 500 mL/2 L) containing BHT. The solid was then filtered through cheesecloth and dried in vacuum.

Figure 3:
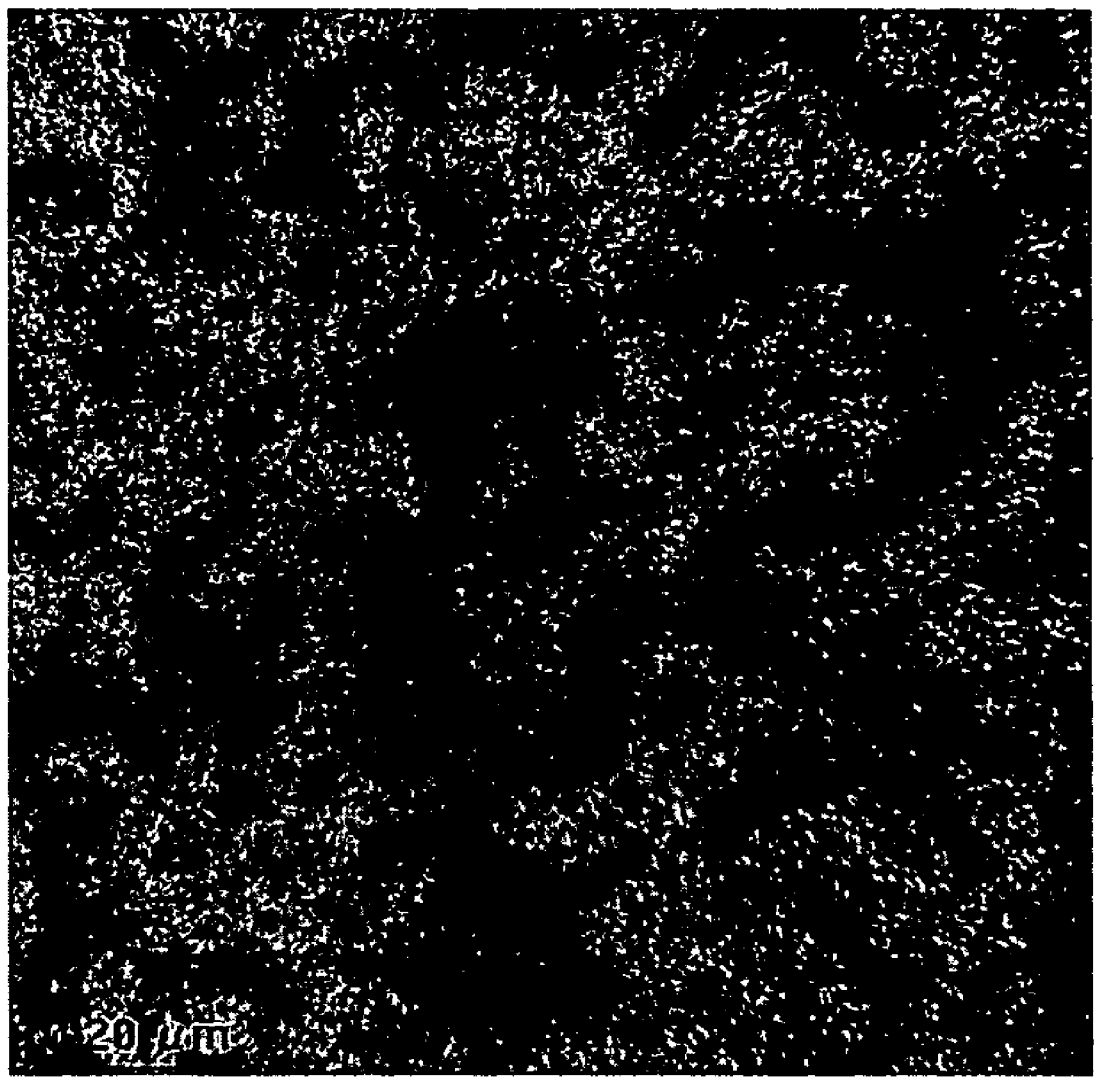
FIG. 3 is a TEM photograph of polymer nanoparticles with controlled architecture of nano-cylinder in an embodiment of the invention.

GPC analysis of the intermediate product, based on a polystyrene/THF standard, indicated that the ST-TBST block copolymer had a mean molecular weight (Mn) of 34620 with Mw/Mn=1.11. The TEM analysis was taken on a hexane solution of the final product at $10^{-4}$ wt % concentration. A drop of the diluted solution was then coated on a graphed copper micro-grid. After the solvent was vaporized, the grid was stained with $RuO_4$ and was then examined by TEM. The results showed that the product synthesized contains nano-sized cylinders (see FIG. 3). The diameter of the cylinder was about 40 nm; and the length of the cylinder was about 0.2 um. The cylinders can be simply separated using physical precipitation or centrifuge methods.

Example 3

The reactor was charged with 2 lbs. hexane and 0.45 lbs. t-butylstyrene (TbST). The jacket of the reactor was heated to 125° F. When the batch reached 130° F., 3.0 ml of 1.6 M oops/hexane solution and 7 ml of 1.68 M butyl lithium/hexane solution were added. The polymerization showed an exothermic peak after 5 minutes of reaction. After 1.5 hours, 1.5 lb. styrene/Hexane blend (containing 32.8 wt % styrene) were added to the reactor that was still maintained at 130° F. An exothermic peak was observed after 10 minutes. After 1.5 hours, a sample was taken for GPC analysis. Then, 50 ml of divinylbenzene was added to the reaction mixture. After another 1.5 hours of reaction, the reaction mixture was cooled down and dropped in an isopropanol/acetone solution (about 500 mL/2 L) containing BHT. The solid was then filtered through cheesecloth and dried in vacuum.

Figure 4:
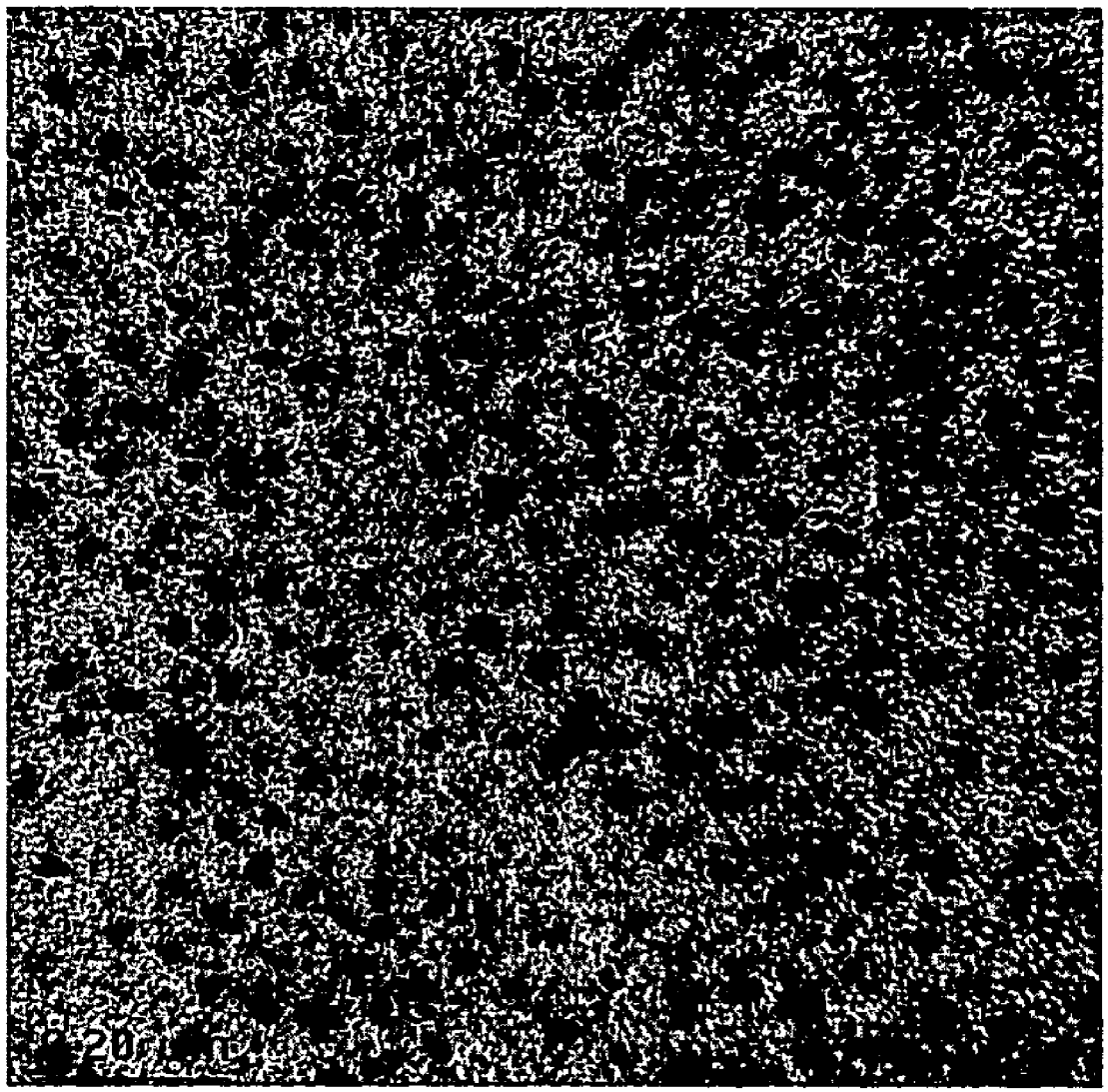
FIG. 4 is a TEM photograph of polymer nanoparticles with controlled architecture of nano-sphere in an embodiment of the invention.

GPC analysis of the intermediate product, based on a polystyrene/THF standard, indicated that the ST-TBST block copolymer had a mean molecular weight (Mn) of 31270 with Mw/Mn=1.07. The TEM analysis was taken on a hexane solution of the final product at $10^{-4}$ wt % concentration. A drop of the diluted solution was then coated on a graphed copper micro-grid. After the solvent was vaporized, the screen was examined by TEM. The results showed that the product synthesized contains nano-sized spheres (see FIG. 4). The diameter of the spheres was about 30 nm and the spheres were uniform in size.

Example 4

The reactor was charged with 4 lbs. hexane and 0.43 lbs. t-butylstyrene (TbST). The jacket of the reactor was heated to 130° F. When the batch reached 130° F., 3.0 ml of 1.6 M oops/hexane solution and 6 ml of 1.68 M butyl lithium/hexane solution were added. The polymerization showed an exothermic peak after 5 minutes of reaction. After 1.5 hours, 1.49 lb. styrene/Hexane blend (containing 32.8 wt % styrene) were added to the reactor that was still maintaining at 130° F. An exothermic peak was observed after 10 minutes. After 1.5 hours, a sample was taken for GPC analysis. Then, 50 ml of divinylbenzene was added to the reaction mixture. After another 1.5 hours of reaction, the reaction mixture was cooled down and dropped in an isopropanol/acetone solution (about 500 mL/2 L) containing BHT. The solid was then filtered through cheesecloth and dried in vacuum.

Figure 5:
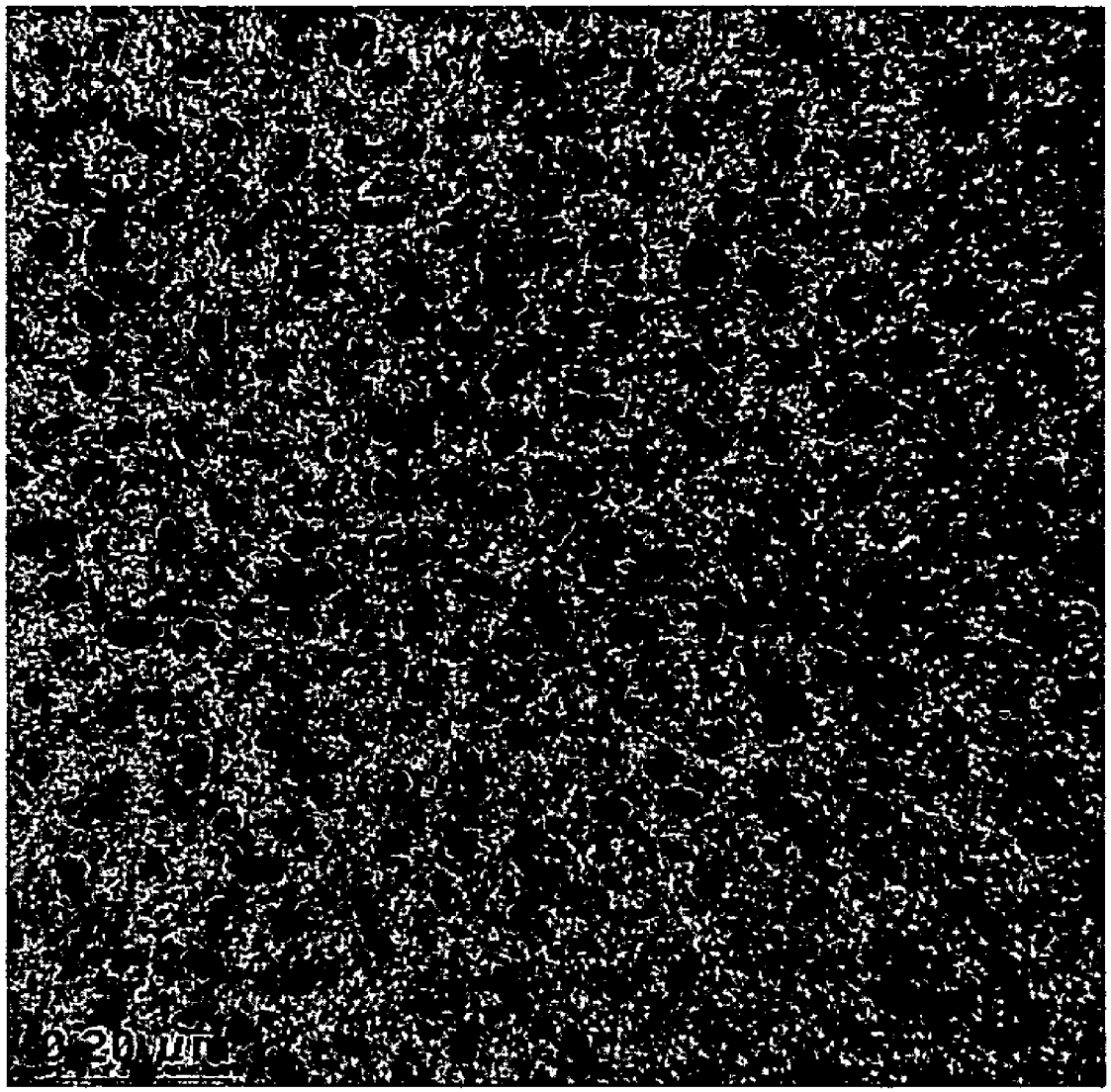
FIG. 5 is a TEM photograph of polymer nanoparticles with controlled architecture of nano-ellipsoid in an embodiment of the invention.

The TEM analysis was taken on a hexane solution of the final product at $10^{-4}$ wt % concentration. A drop of the diluted solution was then coated on a graphed copper micro-grid. After the solvent was vaporized, the screen was examined by TEM. The results showed that the product synthesized contains nano-sized ellipsoids (see FIG. 5). The image showed that the synthesized material was made of nano-ellipsoids. GPC analysis of the intermediate product, based on a polystyrene/THF standard, indicated that the ST-TBST block copolymer had a mean molecular weight (Mn) of 52140 with Mw/Mn=1.05.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. Polymer nanoparticles, which have a controlled architecture selected from the group consisting of nano-necklace and nano-cylinder; and which comprise a core polymerized from multiple-vinyl-substituted aromatic hydrocarbons, a shell polymerized from alkyl-substituted styrene monomer, and a styrene monomer layer between the core and the shell;

wherein the styrene monomer and alkyl-substituted styrene monomer form diblock copolymers.

2. Polymer nanoparticles according to claim 1, in which the alkyl-substituted styrene monomer may have a structure represented by the formula as shown below:

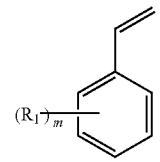

wherein m in an integer and $1 \leq m \leq 5$; and $R_1$ is selected from saturated or unsaturated, substituted or unsubstituted, straight or branched, cyclic or acyclic $C_3$-$C_8$ alkyl groups.

3. Polymer nanoparticles according to claim 1, in which the alkyl-substituted styrene monomer is selected from one or more of the compounds as shown below:

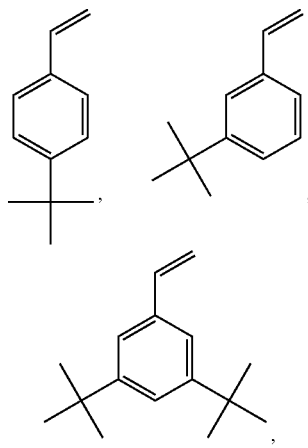

4. Polymer nanoparticles according to claim 1, in which the multiple-vinyl-substituted aromatic hydrocarbon has a formula as shown below:

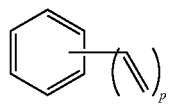

wherein p is an integer and $2 \leq p \leq 6$.

5. Polymer nanoparticles according to claim 1, in which the multiple-vinyl-substituted aromatic hydrocarbon is selected from one of the following isomers or any combination thereof:

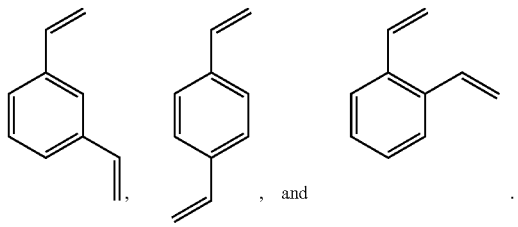

6. Polymer nanoparticles according to claim 1, which have a controlled architecture of nano-necklace with a mean diameter of from about 5 nm to about 200 nm and an average length of from about 1 μm to about 1,000 μm.

7. Polymer nanoparticles according to claim 1, which have a controlled architecture of nano-necklace with a mean diameter of from about 30 nm to about 40 nm and an average length of from about 1 μm to about 10 μm.

8. Polymer nanoparticles according to claim 1, which have a controlled architecture of nano-cylinder with mean a diameter of from about 5 nm to about 100 nm and an average length of from about 200 nm to about 5 μm.

9. Polymer nanoparticles according to claim 1, which have a controlled architecture of nano-cylinder with a mean diameter of from about 35 nm to about 45 nm and an average length of from about 0.15 μm to about 0.25 μm.

10. A rubber article comprising a formulation including the polymer nanoparticles of claim 1.

11. The rubber article according to claim 10, comprising a tire.

* * * * *